United States Patent [19]
Camplin et al.

[11] Patent Number: 5,820,199
[45] Date of Patent: Oct. 13, 1998

[54] FRAME ASSEMBLY FOR AN OPERATOR'S COMPARTMENT

[75] Inventors: Chris F. Camplin, Garner; Paul J. Staebler, Jr., Clayton; Gary D. Hiatt, Raleigh, all of N.C.; Adrian Mulholland, St. James; Philip C. Wright, Northampton, both of England

[73] Assignee: Caterpillar Inc., Peoria, Ill.

[21] Appl. No.: 554,381

[22] Filed: Nov. 8, 1995

[51] Int. Cl.$^6$ .................................................. B62D 25/00
[52] U.S. Cl. ..................... 296/102; 296/190; 296/205; 280/756; 180/89.12; 52/731.6
[58] Field of Search .................... 296/102, 190, 296/203, 205; 280/756, 797; 180/89.12; 52/731.4, 731.6

[56] References Cited

U.S. PATENT DOCUMENTS

| 3,451,713 | 6/1969 | Hollingshead . | |
|---|---|---|---|
| 3,656,803 | 4/1972 | Brown et al. | 296/102 |
| 4,023,851 | 5/1977 | Palmer et al. | 180/89.12 |
| 4,079,985 | 3/1978 | Martin . | |
| 4,135,756 | 1/1979 | Hausmann . | |
| 4,210,362 | 7/1980 | Boersma | 296/190 |
| 4,772,065 | 9/1988 | Nakata et al. | 264/279 |

FOREIGN PATENT DOCUMENTS

| 2685276 | 6/1993 | France | 180/89.12 |
|---|---|---|---|
| 413711 | 7/1934 | United Kingdom | 52/731.4 |
| 1428528 | 3/1976 | United Kingdom . | |
| 2194921 | 3/1988 | United Kingdom . | |

Primary Examiner—Dennis H. Pedder
Attorney, Agent, or Firm—Claude F. White; Daian L. Charlton

[57] ABSTRACT

A frame assembly for an operator's compartment includes an upper roof portion, a lower base portion, and first and second side support assemblies connected between the roof portion and the base portion. Each side support assembly includes a straight part, comprised of a formed tube, and a curved part, formed as a fabricated box section having several individual wall plates. The fabricated box section curved parts are stronger than the formed tubes and are, therefore, in the area of highest stress.

9 Claims, 4 Drawing Sheets

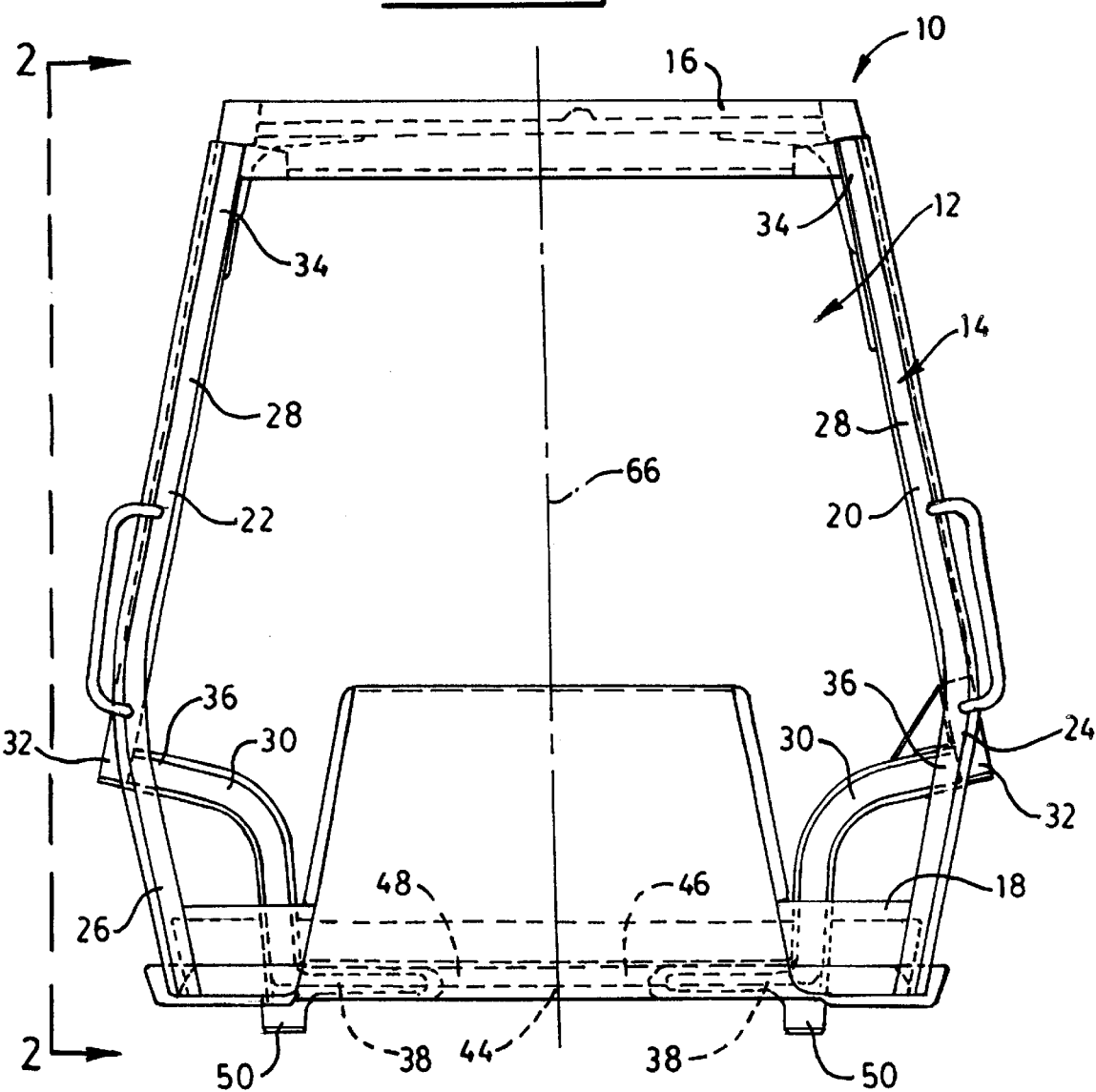

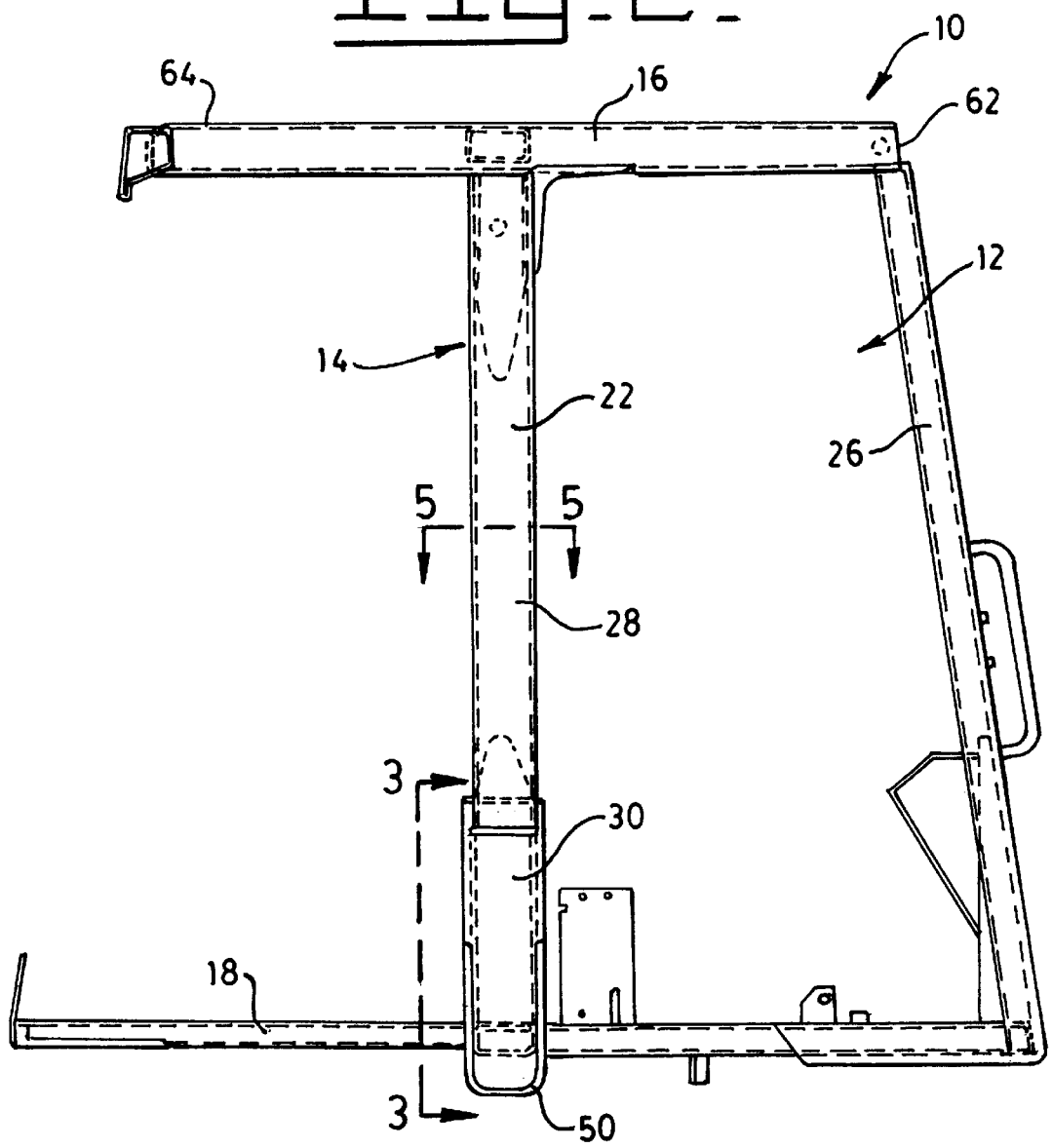

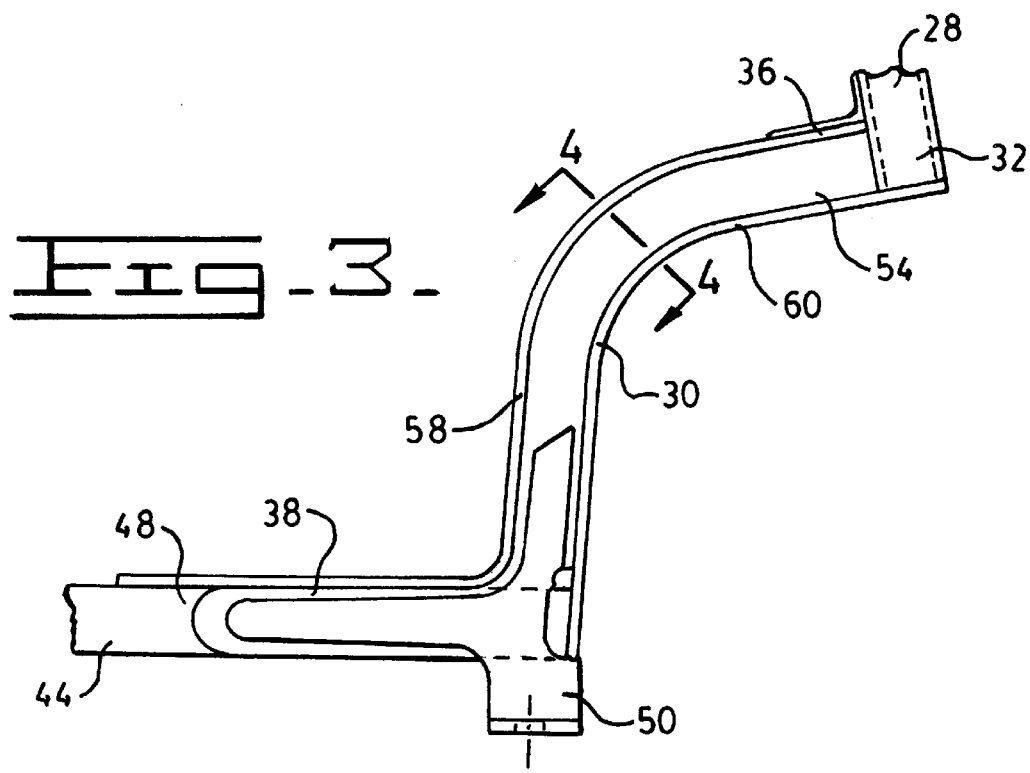
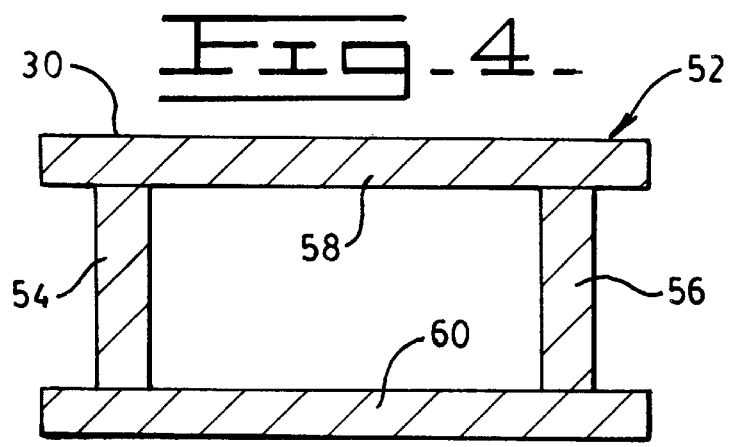
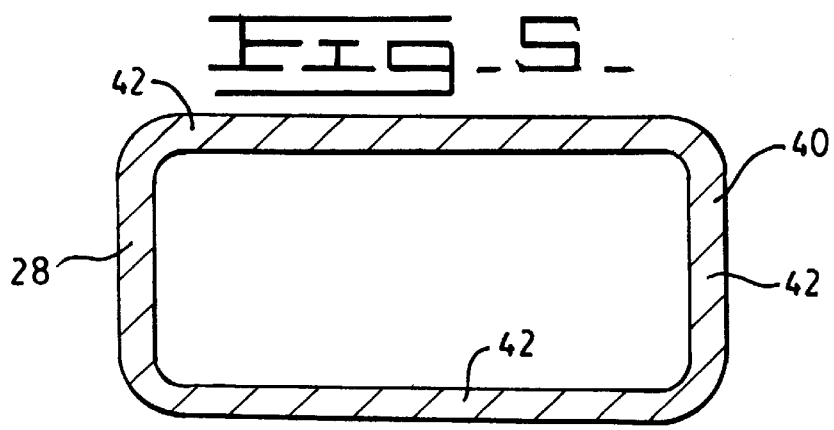

FRAME ASSEMBLY FOR AN OPERATOR'S COMPARTMENT

TECHNICAL FIELD

This invention relates generally to a frame assembly for the operator's compartment of a work machine and more particularly to such a frame assembly which provides increased strength in a specific location.

BACKGROUND ART

The operator's compartment of earthmoving and construction work machines are often equipped with a heavy framework or protective structure. These structures are generally formed of various lengths of steel tubing which are welded together to form the specific framework. Such structures are generally required to meet certain governmental requirements for strength and rigidity. To meet the requirements, the tubing framework is often re-enforced with steel plates and gussets in specific areas requiring greater strength and resistance to deflection. The addition of such re-enforcing plates is time consuming and adds cost and weight to framework.

The present invention is directed to overcoming one or more of the problems as set forth above.

DISCLOSURE OF THE INVENTION

In one aspect of the invention, a frame assembly for an operator's compartment of a work machine includes a frame structure having an upper roof portion, a lower base portion, and first and second side support assemblies. Each of the side support assemblies has a first substantially straight part and a second curved part, with the straight part being connected to the roof portion and the curved part being connected to the base portion. Each of the straight parts consists of a formed tube and each of the curved parts is formed as a fabricated box section having several individual wall plates.

Frame structures for operator's compartments of work machines need to be strong and rigid. However, if they are over designed, then the additional strength adds weight, cost, and bulk without a corresponding benefit. In many applications, the structures require more strength and rigidity in certain locations. However, since the frame structures are often formed of pre-formed steel tubes, the only way to increase the strength at specific locations is to add plates or gussets. Such plates add weight, bulk, and costs.

The subject frame assembly offers a solution to the above noted problems by forming certain areas of the frame assembly of fabricated box beams.

BRIEF DESCRIPTION OF THE DRAWINGS

FIG. 1 is a diagrammatic front elevational view of a frame assembly of the subject invention;

FIG. 2 is a diagrammatic side elevational view taken generally along the lines 2—2 of FIG. 1;

FIG. 3 is an enlarged diagrammatic view taken generally along the lines 3—3 of FIG. 2;

FIG. 4 is an enlarged diagrammatic sectional view taken generally along the lines 4—4 of FIG. 3;

FIG. 5 is an enlarged diagrammatic sectional view taken generally along the lines 5—5 of FIG. 2.

BEST MODE FOR CARRYING OUT THE INVENTION

Figure 6:
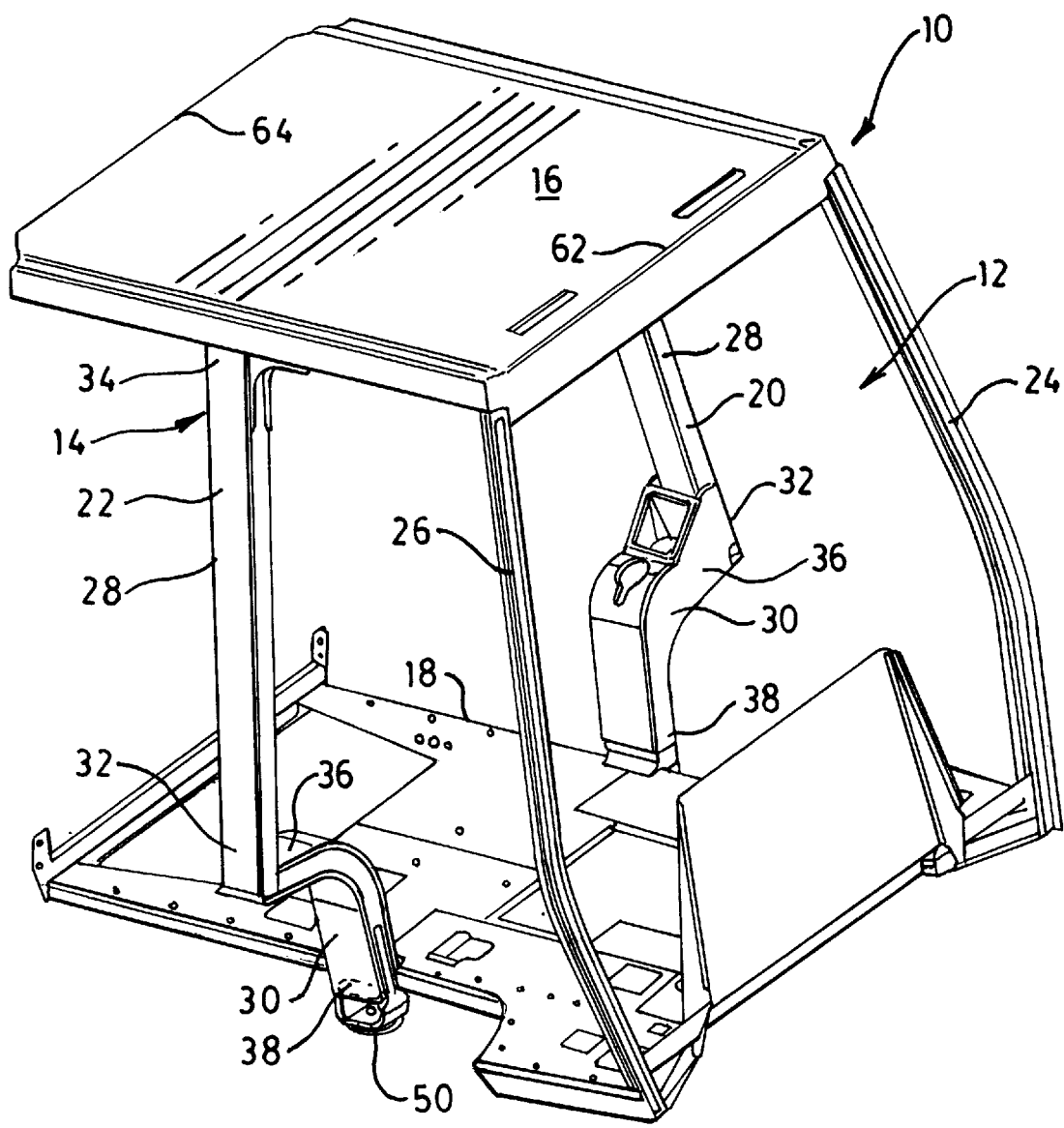
FIG. 6 is a diagrammatic perspective view of the subject frame assembly.

With reference to the drawings, a frame assembly 10 for an operator's compartment 12 of a work machine (not shown) includes a frame structure 14 having an upper roof portion 16, a lower base portion 18, first and second spaced-apart side support assemblies 20,22 and first and second spaced-apart front support members 24,26. Each of the first and second side support assemblies 20,22 has a first substantially straight part 28 and a second curved part 30. The first straight part 28 has first and second end portion 32,34 and the second curved part 30 has first and second end portion 36,38. The first end portions 32, of the straight part 28, are connected to the respective first end portions 36 of the curved part 30, while the second end portions 34 of the straight part 28 are connected to opposite sides of the roof portion 16. The first end portions 36 of the curved part 30 are spaced above and outwardly of the base portion 18 and the second end portions 38 are positioned adjacent the base portion 18.

The first straight parts 28 slope outwardly away from the roof portions and join curved part 30. Each of the straight parts 28 is formed of a tube 40 having a continuous common wall section 42. Although of a different shape and size, the front support members 20,22 are also formed of a tube similar to the tube 40 of the straight parts 28. The front support members 20,22 are adapted to be connected to the roof portion 16 and to the base portion 18. Additionally, a cross-tube 44, having first and second end portions 46,48, is positioned beneath the base portion 18. The first and second end portions 46,48 of the cross-tube are adapted to connect with the second end portions of the curved parts 30.

Each of the second end portions 38 of the curved parts 30 includes a mounting bracket 50 which is adapted to mount the frame assembly 10 to the frame of the work machine. Each of the curved parts 30 is formed as a fabricated box section 52. The box section 52 is comprised of individual first, second, third and fourth steel plates 54,56,58,60 which are joined together, as by welding. The first and second plates 54,56 are substantially similar in size and shape.

The roof portion 16 has a first forward end 62 and a second rearward end 64. The first and second side support assemblies 20,22 are positioned about midway between the first forward end 62 and the second rearward end 64. The frame structure 14 is substantially symmetrical about a central vertical plane 66 which passes through the roof portion 16 and the base portion 18.

Industrial Applicability

With reference to the drawings and the previous detailed description, the subject frame assembly 10 is particularly useful as a protective frame structure 14 for an operator's compartment 12 of a work machine (not shown). The frame assembly 10 has a frame structure 14 which surrounds the operator's compartment 12. The frame structure 14 includes the first and second side support assemblies 20,22, each of which is comprised of a straight part 28 and a curved part 30. The straight part 28 consists of formed tubes 40 and the curved parts 30 are formed as fabricated box sections 52. The fabricated box sections 52 are formed of a plurality of steel plates 54,56,58,60 which are welded together. The box sections 52 are stronger and more rigid than the formed tubes 40 and, therefore, are positioned in the area of highest stress. The stronger curved parts 30 join together the straight parts 28, and cross-tube 44, and the base portion 18.

Other aspects, objects, and advantages of this invention can be obtained from a study of the drawings, the disclosure, and the appended claims.

We claim:

1. A frame assembly for an operator's compartment, comprising:

a frame structure having an upper roof portion, a lower base portion, and first and second spaced apart side support assemblies;

each of said first and second side support assemblies having a first substantially straight part and a second curved part, said first straight part being connected to said roof portion and to said curved part, and said second curved part being connected to said base portion and to said first straight part;

each of said first straight parts formed of a tube having continuous common wall sections; and each of said second curved parts formed as a fabricated box section having individual first, second, third, and fourth wall plates, said plates being joined together to form said box section.

2. A frame assembly, as set forth in claim 1, wherein said first straight parts slope outwardly away from said roof portion.

3. A frame assembly, as set forth in claim 1, wherein each of said second curved parts has a first end portion spaced above and outwardly of said base portion, and a second end portion positioned adjacent said base portion.

4. A frame assembly, as set forth in claim 3, wherein each of said first straight parts has first and second end portions with said first end portions connected to said respective first end portions of said second curved parts and said second end portions connected to opposite sides of said roof portion.

5. A frame assembly, as set forth in claim 3, wherein each of said second end portions of said curved parts includes a mounting bracket.

6. A frame assembly, as set forth in claim 3, including a cross-tube positioned beneath said base portion, said cross-tube having first and second end portions connected to said second end portions of said curved parts.

7. A frame assembly, as set forth in claim 1, wherein said frame structure is substantially symmetrical about a central vertical plane passing through said roof portion and said base portion.

8. A frame assembly, as set forth in claim 1, including first and second spaced apart front support members, said support members being connected to said roof portion and to said base portion.

9. A frame assembly, as set forth in claim 1, wherein said roof portion has a first forward end and a second rearward end and said first and second side support assemblies are positioned about midway between said first forward end and said second rearward end.

\* \* \* \* \*